US007008004B2

(12) United States Patent
Ortega et al.

(10) Patent No.: US 7,008,004 B2
(45) Date of Patent: Mar. 7, 2006

(54) BOATTAIL PLATES WITH NON-RECTANGULAR GEOMETRIES FOR REDUCING AERODYNAMIC BASE DRAG OF A BLUFF BODY IN GROUND EFFECT

(75) Inventors: Jason M. Ortega, Pacifica, CA (US); Kambiz Sabari, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/668,820

(22) Filed: Sep. 22, 2003

(65) Prior Publication Data

US 2005/0168012 A1  Aug. 4, 2005

Related U.S. Application Data

(60) Provisional application No. 60/412,417, filed on Sep. 20, 2002, provisional application No. 60/475,212, filed on May 30, 2003.

(51) Int. Cl.
*B62D 35/00* (2006.01)
(52) U.S. Cl. .............................. 296/180.1; 296/180.4; 105/1.1
(58) Field of Classification Search ............ 296/180.1, 296/180.4; 105/1.1
See application file for complete search history.

(56) References Cited

U.S. PATENT DOCUMENTS

| 2,665,137 | A | * | 1/1954 | Kamm | ........................ 280/1 |
| 3,971,586 | A | | 7/1976 | Saunders et al. | |
| 4,682,808 | A | | 7/1987 | Bilanin | |
| 4,867,397 | A | * | 9/1989 | Pamadi et al. | ........... 296/180.1 |
| 5,058,837 | A | | 10/1991 | Wheeler | |
| 5,498,059 | A | | 3/1996 | Switlik | |
| 5,947,548 | A | | 9/1999 | Carper et al. | |
| 6,286,894 | B1 | | 9/2001 | Kingham | |
| 6,309,010 | B1 | | 10/2001 | Whitten | |
| 2002/0030384 | A1 | | 3/2002 | Basford | |

FOREIGN PATENT DOCUMENTS

| DK | 64274 | * | 2/1946 | ............... 296/180.1 |
| FR | 875876 | * | 10/1942 | ............... 296/180.1 |
| GB | 2098558 | * | 11/1982 | ............... 296/180.4 |

* cited by examiner

*Primary Examiner*—Dennis H. Pedder
(74) *Attorney, Agent, or Firm*—James S. Tak; Alan H. Thompson

(57) ABSTRACT

An apparatus for reducing the aerodynamic base drag of a bluff body having a leading end, a trailing end, a top surface, opposing left and right side surfaces, and a base surface at the trailing end substantially normal to a longitudinal centerline of the bluff body, with the base surface joined (1) to the left side surface at a left trailing edge, (2) to the right side surface at a right trailing edge, and (3) to the top surface at a top trailing edge. The apparatus includes left and right vertical boattail plates which are orthogonally attached to the base surface of the bluff body and inwardly offset from the left and right trailing edges, respectively. This produces left and right vertical channels which generate, in a flowstream substantially parallel to the longitudinal centerline, respective left and right vertically-aligned vortical structures, with the left and right vertical boattail plates each having a plate width defined by a rear edge of the plate spaced from the base surface. Each plate also has a peak plate width at a location between top and bottom ends of the plate corresponding to a peak vortex of the respective vertically-aligned vortical structures.

12 Claims, 5 Drawing Sheets

BOATTAIL PLATES WITH NON-RECTANGULAR GEOMETRIES FOR REDUCING AERODYNAMIC BASE DRAG OF A BLUFF BODY IN GROUND EFFECT

I. CLAIM OF PRIORITY IN PROVISIONAL APPLICATION

This application claims priority in provisional application filed on Sep. 20, 2002, entitled "Drag Reduction of a Bluff Body in Ground Effect Through the Use of Counter-Rotating Vortex Pairs" Ser. No. 60/412417, and provisional application filed on, May 30, 2003 entitled "Drag Reduction of a Bluff Body in Ground Effect Through the Use of Wedge-Shaped Boattail Plates" Ser. No. 60/475212 both by Jason M. Ortega et al.

The United States Government has rights in this invention pursuant to Contract No. W-7405-ENG-48 between the United States Department of Energy and the University of California for the operation of Lawrence Livermore National Laboratory.

II. FIELD OF THE INVENTION

The present invention relates to aerodynamic drag reduction devices and methods, and more particularly to an aerodynamic base drag reduction apparatus and method for bluff bodies using boattail plates having non-rectangular geometries for reducing aerodynamic base drag of a bluff body in ground effect.

III. BACKGROUND OF THE INVENTION

As is well known in the art of vehicle design, the fuel consumption of a vehicle associated with its movement is directly related to certain aerodynamic characteristics of the vehicle, such as the aerodynamic drag of the vehicle expressed as the drag coefficient, Cd. As the aerodynamic drag experienced by a vehicle increases, the fuel costs also correspondingly increase due to the greater energy required to overcome the drag. For example, for a vehicle traveling 70 mph on a roadway, approximately 65% of the total fuel consumption of its engine is used to overcome aerodynamic drag. Thus, even a slight reduction in the aerodynamic drag coefficient of the vehicle can result in a significant improvement in fuel economy.

Bluff bodies in particular are known to have high drag coefficients due to the presence of a recirculation zone in the wake thereof, and the relatively lower pressures acting as a consequence on the rear base of the trailing end. The drag which results from the blunt-ended trailing ends of bluff bodies is commonly known as "aerodynamic base drag." Numerous attempts have been made over the years to reduce the aerodynamic base drag of blunt-ended bluff bodies, especially land-based vehicles such as tractor-trailers and trailer vans having a flat vertical base surface. Some of the proposed concepts are passive and include such implements as boattail plates, rounding the rear corners of the vehicle near its base, and streamlining the rear of the vehicle with ogives or wedges. Other proposed concepts are active, such as plumbing systems that inject or release air near the rear corners of the vehicle or acoustic systems that actively perturb the flow coming off the rear of the vehicle. Some example prior developments are shown in U.S. Pat. Nos. 4,682,808, 5,498,059, 6,286,894B1, and U.S. Patent Publication No. US2002/0030384A1. These examples illustrate variations on improving by reducing the aerodynamic base drag experienced by tractor-trailers having a substantially flat base surface at the trailing end.

The need for and benefits of reducing the aerodynamic base drag of bluff body vehicles, especially land-based vehicles traveling at, for example, highway speeds, are compelling and widely recognized. It would therefore be advantageous to provide a simple cost-effective base drag reduction apparatus and method for use on such bluff bodies having base surfaces creating a substantial recirculation zone, to raise the pressure on the base surface and thereby reduce the aerodynamic base drag.

IV. SUMMARY OF THE INVENTION

One aspect of the present invention includes an apparatus for reducing the aerodynamic base drag of a bluff body having a leading end, a trailing end, a top surface, opposing left and right side surfaces, and a base surface at the trailing end substantially normal to a longitudinal centerline of the bluff body, said base surface joined to the left side surface at a left trailing edge, to the right side surface at a right trailing edge, and to the top surface at a top trailing edge, said apparatus comprising: left and right vertical boattail plates orthogonally attached to the base surface of the bluff body and inwardly offset from the left and right trailing edges, respectively, to produce left and right vertical channels which generate, in a flowstream substantially parallel to the longitudinal centerline, respective left and right vertically-aligned vortical structures therein, said left and right vertical boattail plates each having a plate width defined by a rear edge spaced from the base surface, and a peak plate width at a location between top and bottom ends thereof, corresponding to a peak vortex of the respective vertically-aligned vortical structures.

Another aspect of the present invention includes an apparatus for reducing the aerodynamic base drag of a bluff body having a leading end, a trailing end, a top surface, opposing left and right side surfaces, and a base surface at the trailing end substantially normal to a longitudinal centerline of the bluff body, said base surface joined to the left side surface at a left trailing edge, to the right side surface at a right trailing edge, and to the top surface at a top trailing edge, said apparatus comprising: left and right vertical boattail plates orthogonally attached to the base surface of the bluff body and inwardly offset from the left and right trailing edges, respectively, to produce left and right vertical channels which generate, in a flowstream substantially parallel to the longitudinal centerline, respective left and right vertically-aligned vortical structures therein, said left and right vertical boattail plates having a non-rectangular geometry with a peak plate width at a location between top and bottom ends of said vertical plates.

Another aspect of the present invention includes a vehicle attachment for reducing the aerodynamic base drag of a bluff body having a leading end, a trailing end, a top surface, opposing left and right side surfaces, and a base surface at the trailing end substantially normal to a longitudinal centerline of the bluff body, said base surface joined to the left side surface at a left trailing edge, to the right side surface at a right trailing edge, and to the top surface at a top trailing edge, said apparatus comprising: left and right vertical boattail plates orthogonally connectable to the base surface of the bluff body so as to be inwardly offset from the left and right trailing edges, respectively, and produce left and right vertical channels which generate, in a flowstream substantially parallel to the longitudinal centerline, respective left and right vertically-aligned vortical structures therein, said left and right vertical boattail plates each having a plate width defined by a rear edge spaced from the base surface, and a peak plate width at a location between top and bottom ends thereof, corresponding to a peak vortex of the respective vertically-aligned vortical structures.

Another aspect of the present invention include, in a bluff body land-based vehicle having a leading end, a trailing end, a top surface, opposing first and second side surfaces, and a substantially flat base surface at the trailing end substantially normal to a longitudinal centerline of the bluff body, the improvement comprising: means located alongside at least one of the top surface and first and second side surfaces for generating, in a flowstream substantially parallel to the longitudinal centerline, a pair of counter-rotating vortices which confluence together downstream in the wake of the vehicle in a direction orthogonal to the flowstream such that the confluence induces the flowstream passing over the top surface to turn down and around behind the trailing end to raise the pressure on the base surface and reduce the aerodynamic base drag.

V. BRIEF DESCRIPTION OF THE DRAWINGS

The accompanying drawings, which are incorporated into and form a part of the disclosure, are as follows.

VI. DETAILED DESCRIPTION

The present invention is directed to an aerodynamic base drag reduction apparatus and method for use with a bluff body or bluff body vehicle, such as for example a tractor-trailer or other land-based vehicle. "Bluff bodies" are one of two types of fluid-dynamic shapes (the other being "streamlined bodies") and can be generally characterized by the presence of a sizeable recirculation zone in the wake of the bluff body. Thus, bluff bodies are characteristically blunt-ended, non-streamlined moving bodies having a relatively large base surface at a trailing end which causes the large recirculation zone in the wake of the bluff body to produce the base drag. And the base surface of a bluff body vehicle is typically of a type oriented substantially normal to the flowstream, as is commonly seen in tractor-trailer arrangements. This arrangement creates a sharp separation of the flow stream at the edge of base surface and thereby lowers the pressure on the base surface to produce the base drag. It is appreciated that the present invention may be utilized with different types of vehicles including automobiles, aircraft, or any other vehicle encumbered by a recirculation zone characteristic of a bluff body. For land-based bluff body vehicles traveling in close proximity to a ground plane, the present invention may also benefit from the in ground effect which is generally a condition of improved performance encountered when operating near or on the ground due to the interference of the ground surface with the airflow pattern.

The purpose of the present invention is to reduce the aerodynamic base drag of a bluff body traveling in close proximity to a ground plane. The drag reduction is achieved by attaching flat boattail plates that have non-rectangular geometries, such as curved trailing edges to the base of a bluff body. These plates are set slightly inward from the outer edge of the bluff body. The presence of these curved plates forms two vortical flow structures on the base of the bluff body. The first vortical structure is trapped between the freestream flow and the exterior of the plates and the second vortical structure is trapped in the interior of the plates. The outer vortical structure causes the flow to turn more sharply around the base of the bluff body, while the inner vortical structure turns the flow in the upstream direction, which increases the pressure on the base of the bluff body. Consequently, there is a net reduction in the aerodynamic base drag. Moreover, the reduction in the plate area at the corners thereof while maintaining a peak width between the end portions of the plate, also serve to improve reduction of aerodynamic base drag, especially in, for example, yawed flow conditions because of the reduction in plate surface area that is less than that of a rectangular boattail plate.

Figure 1:
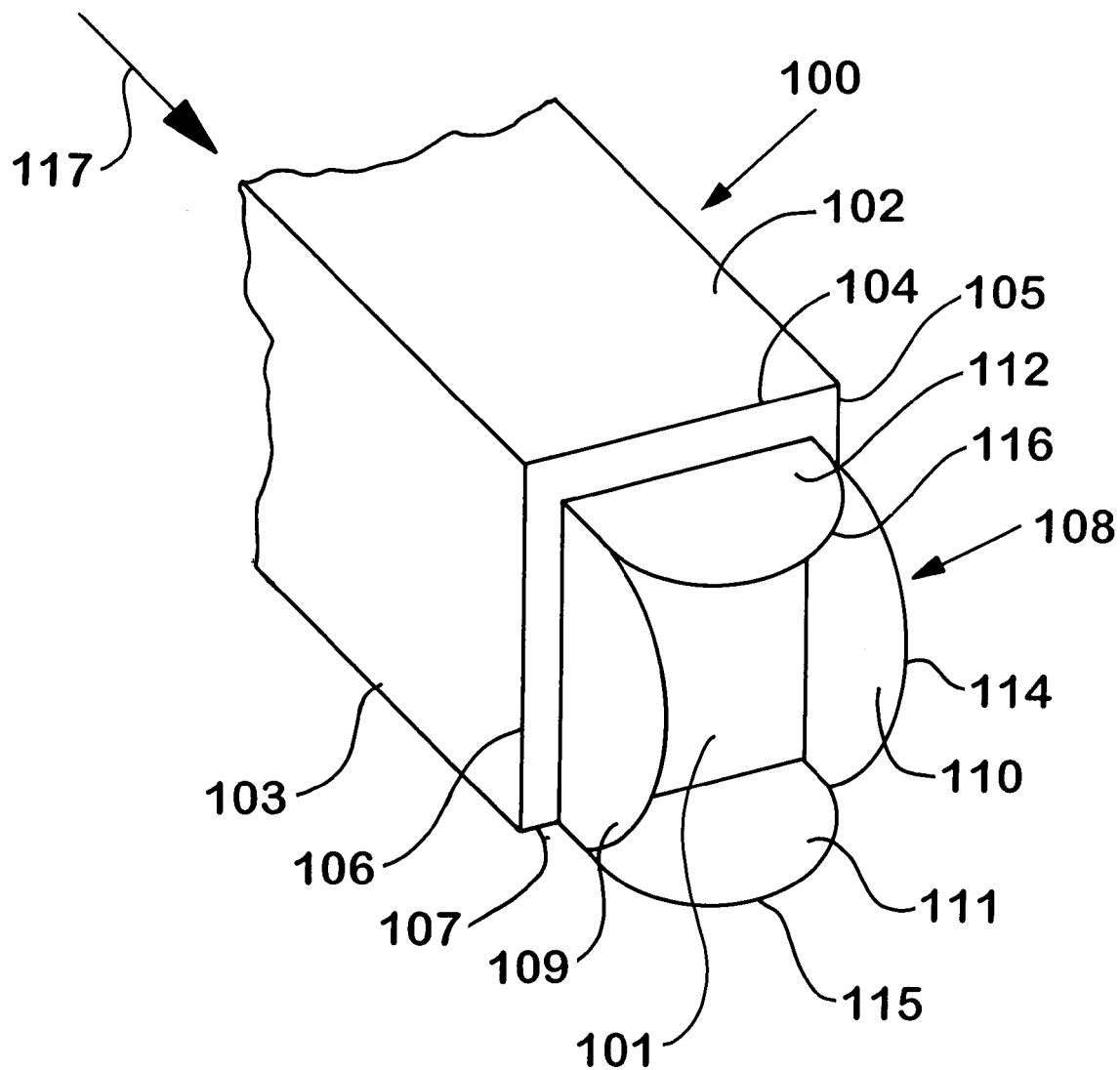
FIG. 1 is a rear perspective view of the base of a modified bluff body having curved plates thereon.

Turning now to the drawings, FIG. 1 shows an exemplary embodiment of the base drag reduction apparatus connected to a bluff body, generally indicated at reference character 100. In particular, FIG. 1 shows the trailing end of the bluff body 100 having a left side 103, an opposite right side (not shown), a top surface 102, and a base surface 101 at the rear of the trailing end. The base surface 101 is joined (a) to the top surface 102 at an upper trailing edge 104, (b) to the left side 103 at a left side trailing edge 106, (c) to the right side at a right side trailing edge 105, and (d) to the bottom surface (not shown) at bottom trailing edge 107. While not shown in FIG. 1, the bluff body may be a land-based vehicle having wheels (not shown) extending below the bottom surface. Additionally, while not shown in FIG. 1, the bluff body 100 is of a type having a leading end opposite the trailing end, with a longitudinal centerline through the leading and trailing ends which is generally parallel to the direction of a flowstream indicated at 117.

Figure 2:
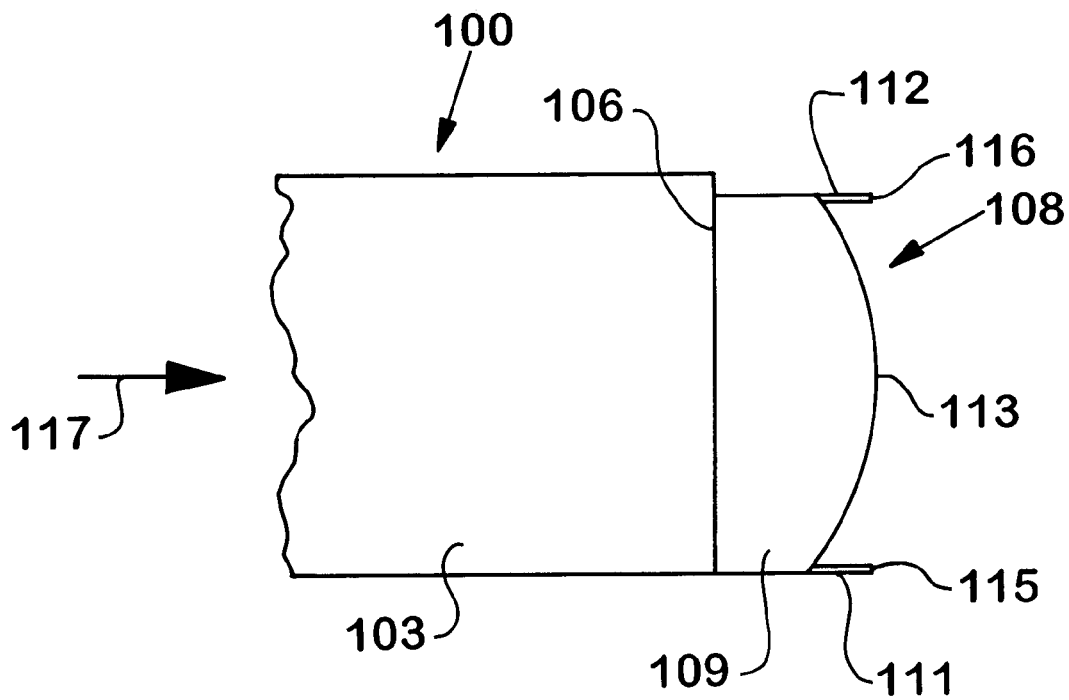
FIG. 2 is a side view of the base of the modified bluff body of FIG. 1.
Figure 3:
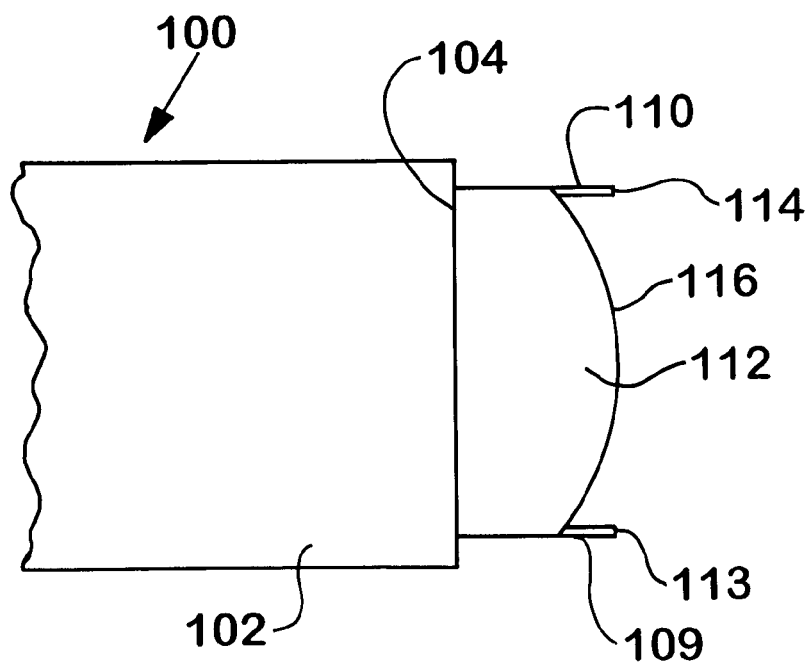
FIG. 3 is a top view of the base of the modified bluff body of FIG. 1.

FIGS. 1–3 also show details of he drag reduction apparatus, generally indicated at reference character 108, and comprising a pair of vertical boattail plates (left vertical plate 109 and right vertical plate 110), and a pair of horizontal boattail plates (upper horizontal plate 112 and lower horizontal plate 115). The four boattail plates are shown orthogonally connected to a bluff body, generally indicated at reference character 100, with the connection and attachment provided by suitable mounting hardware (not shown). Additionally, each plate is inwardly offset from the left, right, upper, and lower trailing edges indicated at 106, 105, 104, and 107, respectively. This produces vertical channels between the vertical plates and the base surface, as well as horizontal channels between the horizontal plates and the base surface. In addition, each of the boattail plates has a non-rectangular plate shape and shown having curved rear edges 113 for the left vertical plate, 116 for the upper horizontal plate, 115 for the lower horizontal plate, and 114 for the right vertical plate. As can be seen in FIG. 1–3, the four boattail plates 109, 110, 111 and 112 have a non-uniform width measured as the distance from the base surface 101 to each respective rear plate edge. In particular, the width at the respective ends of each plate is generally shorter than toward the center thereof, with the trailing edge curvature of the plates chosen such that the plates are wider at their centers and narrower at the corners of the bluff body. The peak widths of the plates may be chosen, as at least six times the step height, i.e. the inset from the trailer edge.

Figure 4:
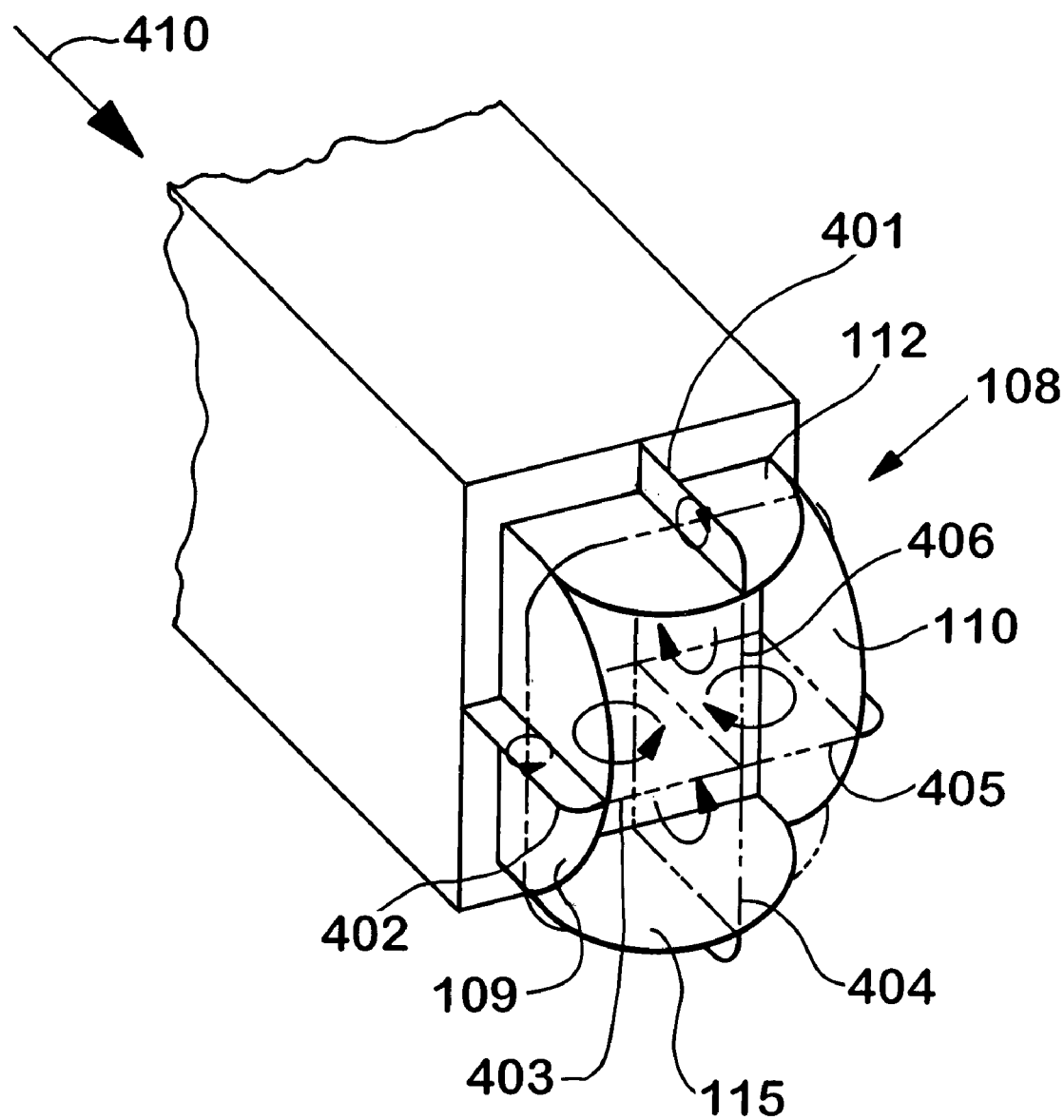
FIG. 4 is a rear perspective view of the base of a modified bluff body illustrating the two vortical structures formed by the curved plates.
Figure 5:
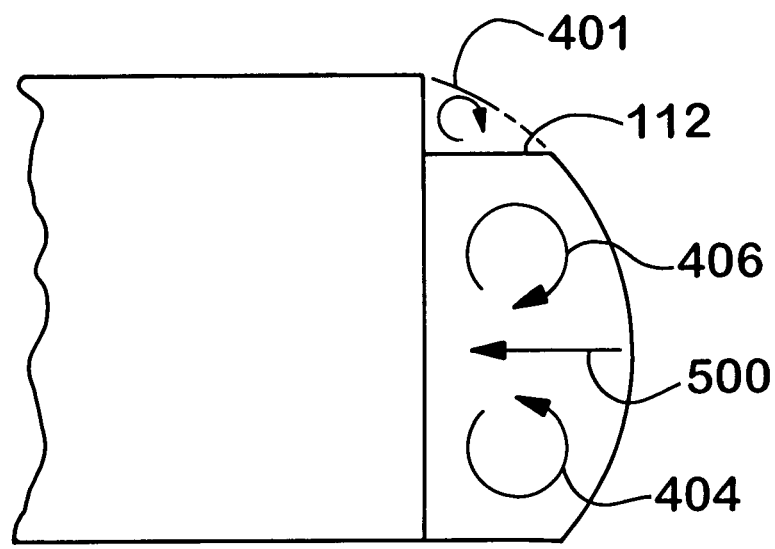
FIG. 5 is a side cross-sectional view of the base of the modified bluff body of FIG. 4.
Figure 6:
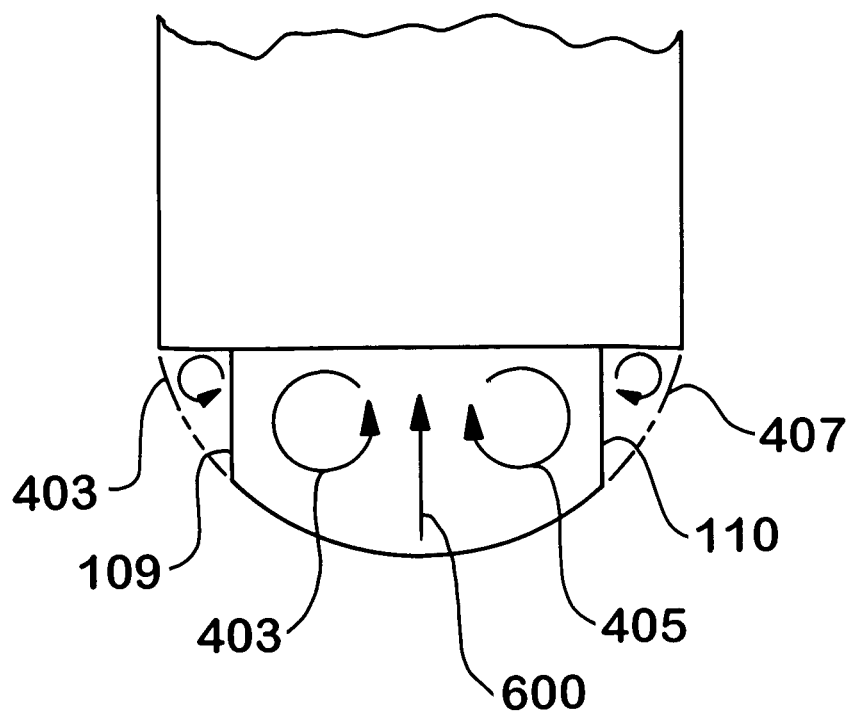
FIG. 6 is a top cross-sectional view of the base of the modified bluff body of FIG. 4.

When a freestream flow 410 is imposed on the bluff body as shown in FIG. 4, two vortical structures are formed on the exterior and interior of the flat plates. FIGS. 4–6 show the boattail plates utilized to generate external vortical structures in the vertical channels and the horizontal channels. In particular, the left vertical channel formed by left vertical plate 109 generates a counter-clockwise vortical structure in a flow stream, while the right vertical channel (see FIG. 6) formed by right vertical plate 110 generates clock-wise vortical structure 407 in the flow stream. And the upper horizontal channel formed by upper horizontal plate 112 generates a clockwise vortical structure in the flow stream as shown in FIG. 5. Each of these vortical structures produced by the non-rectangular boattail plates serve to draw in, pull, or otherwise turn the flowstream in and around behind the trailing end into the wake of the vehicle. The exterior vortical structure resides between the flat plates and the freestream flow, while the interior vortical structures, shown at 403, 404, 405 and 406, reside entirely within the cavity formed by the four plates. The exterior vortical structure causes the flow to turn more sharply around the base of the bluff body, resulting in a wake that is smaller than that of an unmodified bluff body. The interior vortical structure imposes an upstream flow on the center of the base of the bluff body, resulting in an increase in the base pressure on the bluff body. The combined effects of the interior and exterior vortical structures result in an overall reduction of the total aerodynamic drag. Additionally, the non-rectangular shape of the boattail plates also improve turning the flow into around into the base because the reduced or "chopped off" corners in each of the curved and wedge-shaped designs allow airflow to turn more quickly at the corners. As shown in FIG. 4, the swirls shown in each of the respective planes describe the recirculation zones produced by each of the pockets between the boattails and the bluff body surface.

It is also appreciated that the minimum number of plates for operation is three, including the two vertical plates and the top horizontal plate. The bottom horizontal plate 115 shown in the figures may be optionally provided, but not critical since the rear axle may cause a wake that makes a bottom plate less effective. In the case of the curved boattail plates shown in FIG. 4, the two vertical plates and the upper horizontal plate is preferably utilized together.

Figure 7:
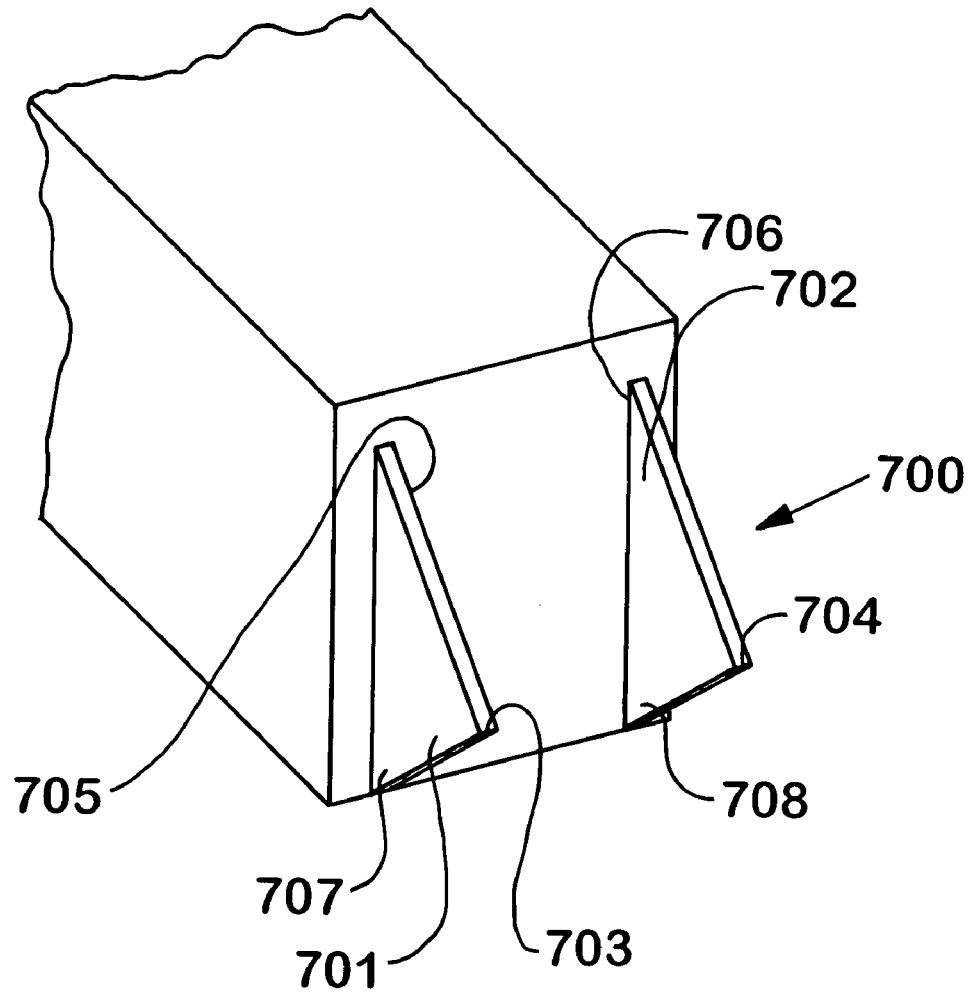
FIG. 7 is a rear perspective view of the base of modified bluff body having wedge shaped plates thereon.

FIG. 7 shows a second embodiment of the present invention, generally indicated at reference character 700 and having wedge shaped vertical boattail plates 701 and 702. Each vertical plate is orthogonally attached to the base surface of the trailing end, and having rear edges with an angular configuration. Thus, the left vertical plate has a peak 703, and the right vertical plate has a peak 704, both of which are toward the center of the plate, such that the opposing ends of each vertical plate have the smallest widths. Similar advantages of vortical generation and drag reduction is achieved in this manner. In contrast to the curved edge boattail plates previously discussed, the two vertical plates may be used alone without requiring an upper horizontal plate.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

We claim:

1. An apparatus for reducing the aerodynamic base drag of a bluff body having a leading end, a trailing end, a top surface, a bottom surface, opposing left and right side surfaces, and a base surface at the trailing end substantially normal to a longitudinal centerline of the bluff body, said base surface joined to the left side surface at a left trailing edge, to the right side surface at a right trailing edge, to the bottom surface at a bottom trailing edge, and to the top surface at a top trailing edge, said apparatus comprising:

left and right vertical boattail plates orthogonally attached to the base surface of the bluff body and inwardly offset from the left and right trailing edges, respectively, and from the top trailing edge, to produce left and right vertical channels which generate, in a flowstream substantially parallel to the longitudinal centerline, respective left and right vertically-aligned vortical structures therein, said left and right vertical boattail plates each having a plate width defined by a rear edge spaced from the base surface, with said plate width being shorter at top and bottom ends thereof than at the center to more quickly turn the flowstream around into the base surface at the top and bottom ends than at the center of the vertical boattail plate.

2. The apparatus of claim 1, further comprising an upper horizontal boattail plate orthogonally attached to the base surface of the bluff body and inwardly offset from the top trailing edge to produce an upper horizontal channel which generates, in the flowstream, an upper horizontally-aligned vortical structure therein, said upper horizontal boattail plate having a plate width defined by a rear edge spaced from the base surface, with said plate width being shorter at left and right ends thereof than at the center, and with the left end of the horizontal boattail plate adjacent the top end of the left vertical boattail plate without extending beyond each other, and the right end of the horizontal boattail plate adjacent the top end of the right vertical boattail plate without extending beyond each other, so that reduced corners are formed which turn the flowstream more quickly around into the base surface at the reduced corners than at the respective centers of the vertical and horizontal boattail plates.

3. The apparatus of claim 1 or 2, wherein the rear edges of the boattail plates are convexedly curvilinear.

4. The apparatus of claim 1 or 2, wherein the rear edges of the boattail plates are angled to produce wedge-shaped boattail plates.

5. An apparatus for reducing the aerodynamic base drag of a bluff body having a leading end, a trailing end, a top surface, a bottom surface opposing left and right side surfaces, and a base surface at the trailing end substantially normal to a longitudinal centerline of the bluff body, said base surface joined to the left side surface at a left trailing edge, to the right side surface at a right trailing edge, to the bottom surface at a bottom trailing edge, and to the top surface at a top trailing edge, said apparatus comprising:

left and right vertical boattail plates orthogonally attached to the base surface of the bluff body and inwardly offset from the left and right trailing edges, respectively, and from the top trailing edge, to produce left and right vertical channels which generate, in a flowstream substantially parallel to the longitudinal centerline, respective left and right vertically-aligned vortical structures therein, said left and right vertical boattail plates having a non-rectangular geometry with a shorter plate width at top and bottom ends thereof than at the center to more quickly turn the flowstream around into the base surface at the top and bottom ends than at the center of the vertical boattail plate.

6. The vehicle attachment of claim 5,
further comprising an upper horizontal boattail plate orthogonally attached to the base surface of the bluff body and inwardly offset from the top trailing edge to produce an upper horizontal channel which generates, in the flowstream, an upper horizontally-aligned vortical structure therein, said upper horizontal boattail plate having a non-rectangular geometry with a shorter plate width at left and right ends thereof than at the center, and with the left end of the horizontal boattail plate adjacent the top end of the left vertical boattail plate without extending beyond each other, and the right end of the horizontal boattail plate adjacent the top end of the right vertical boattail plate without extending beyond each other, so that reduced corners are formed which turn the flowstream more quickly around into the base surface at the reduced corners than at the respective centers of the vertical and horizontal boattail plates.

7. The vehicle attachment of claim 5 or 6,
wherein said boattail plates have a convexedly curvilinear geometry.

8. The vehicle attachment of claim 5 or 6,
wherein said boattail plates have a triangular geometry.

9. A vehicle attachment for reducing the aerodynamic base drag of a bluff body having a leading end, a trailing end, a top surface, a bottom surface, opposing left and right side surfaces, and a base surface at the trailing end substantially normal to a longitudinal centerline of the bluff body, said base surface joined to the left side surface at a left trailing edge, to the right side surface at a right trailing edge, to the bottom surface at a bottom trailing edge, and to the top surface at a top trailing edge, said apparatus comprising:
   left and right vertical boattail plates orthogonally connectable to the base surface of the bluff body so as to be inwardly offset from the left and right trailing edges, respectively, and from the top trailing edge, and produce left and right vertical channels which generate, in a flowstream substantially parallel to the longitudinal centerline, respective left and right vertically-aligned vortical structures therein, said left and right vertical boattail plates each having a plate width defined by a rear edge spaced from the base surface, with said plate width being shorter at top and bottom ends thereof than at the center to more quickly turn the flowstream around into the base surface at the top and bottom ends than at the center of the vertical boattail plate.

10. The vehicle attachment of claim 9,
further comprising an upper horizontal boattail plate orthogonally attached to the base surface of the bluff body and inwardly offset from the top trailing edge to produce an upper horizontal channel which generates, in the flowstream, an upper horizontally-aligned vortical structure therein, said upper horizontal boattail plate having a plate width defined by a rear edge spaced from the base surface, with said plate width being shorter at left and right ends thereof than at the center, and with the left end of the horizontal boattail plate adjacent the top end of the left vertical boattail plate without extending beyond each other, and the right end of the horizontal boattail plate adjacent the top end of the right vertical boattail plate without extending beyond each other, so that reduced corners are formed which turn the flowstream more quickly around into the base surface at the reduced corners than at the respective centers of the vertical and horizontal boattail plates.

11. The vehicle attachment of claim 9 or 10,
wherein the rear edges of the boattail plates are convexedly curvilinear.

12. The vehicle attachment of claim 9 or 10,
wherein the rear edges of the boattail plates are angular to produce wedge-shaped boattail plates.

\* \* \* \* \*